United States Patent Office 3,452,617
Patented July 1, 1969

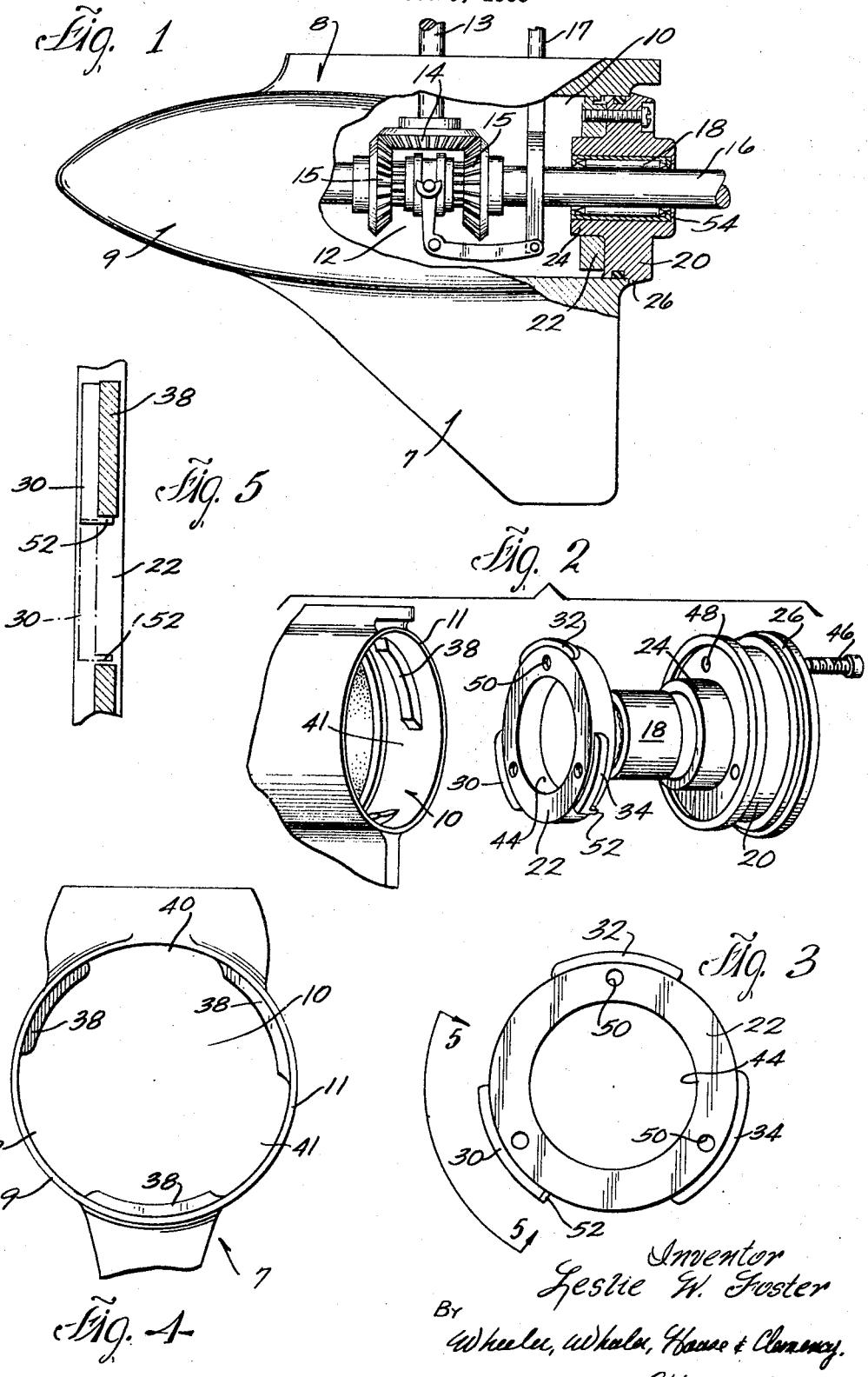

3,452,617
BEARING MOUNTING
Leslie W. Foster, Lake Bluff, Ill., assignor to Outboard Marine Corporation, Waukegan, Ill., a corporation of Delaware
Filed Dec. 9, 1966, Ser. No. 600,574
Int. Cl. F16h 57/02
U.S. Cl. 74—606       8 Claims

ABSTRACT OF THE DISCLOSURE

Disclosed herein is a mounting for a propeller shaft bearing located in the lower unit gear case of a marine propulsion device. The bearing is carried by either a retaining ring or clamping member, which are loosely preassembled, and then projected with the bearing over the propeller shaft and into the gear case. After passage of ears on the retaining ring through gaps between lugs in the throat of the gear case, the retaining ring is rotated so as to position the ears behind the lugs. The bearing, retaining ring and clamping member are then secured to the gear case by clamping the retaining ring and clamping member together thereby engaging the ears with the lugs and seating the clamping member against the gear case.

SUMMARY OF INVENTION

The present invention provides a mounting for a propeller shaft bearing in the lower unit gear case of a marine propulsion device. The invention affords quick alignment of the mounting components which include a clamping member, a retaining ring and spaced lugs in the gear case. The ease of assembly of the components of the bearing mounting greatly simplifies assembly of the bearing in a marine propulsion device and avoids excessive bearing wear caused by misalignment of the bearing.

In accordance with the invention the propeller shaft bearing is carried in a sleeve of a clamping member which is secured to the gear case by a retaining ring. The clamping member carrying the bearing and the retaining ring are loosely assembled and inserted as a unit in the gear case. Means are provided to secure the retaining ring and clamping member to the gear case including ears which extend from the retaining ring and are passed through gaps between lugs in the throat of the gear case. After such passage, the retaining ring is rotated so that ears are then directly behind the lugs and until a tab on one of the ears engages a lug thereby preventing further rotation. The clamping member is then secured in place by tightening bolts extending through the clamping member and threaded into the retaining ring so as to clamp the ears against the gear case lugs and to seat the clamping member against the gear case, securing the assembly in place.

Further objects and advantages will become apparent from the following description and accompanying drawings.

DRAWINGS

FIGURE 1 is a side elevation view, partially broken away and in fragmentary section, of a lower unit gear case of a marine propulsion device, which gear case embodies various features of the invention.

FIGURE 2 is an exploded view of a portion of the structure shown in FIGURE 1.

FIGURE 3 is an enlarged end view of the retainer ring shown in FIGURE 2.

FIGURE 4 is an end view of the gear case shown in FIGURE 1.

FIGURE 5 is a developed view along line 5—5 of FIGURE 3.

DESCRIPTION OF DRAWINGS

Referring now to the drawings, FIGURE 1 shows a marine propulsion device designated generally 7 comprising a lower unit 8, including a gear case 9 having a throat 10, a face 11 and a cavity 12. Extending into the cavity 12 is a drive shaft 13 with a driving gear 14 which selectively drives a pair of gears 15 rotatably carried on a propeller shaft 16. A bellcrank shifting lever 17 is also located in the cavity 12.

The propeller shaft 16 is supported by a bearing 18 and an associated clamping member 20 and retainer ring 22.

In the disclosed construction the bearing 18 is internally carried in a sleeve portion 24 of the clamping member 20. However, the bearing can be carried by the retaining ring in an alternate construction. Although the bearing 18 illustrated in FIGURE 2 is a needle bearing, a sleeve bearing, a ball bearing or other bearing can be utilized in accordance with this invention. The clamping member 20 is provided with a raised annular shoulder 26 which seats on the face 11 of the gear case 9.

The clamping member and bearing are secured to the gear case 9 by interengaging members which in the disclosed construction comprise three ears 30, 32 and 34 spaced along the periphery of the retainer ring 22 and three lugs 38 which are located in the throat 10 and which are spaced equidistantly from the face 11. Lugs 38 are spaced around the throat to provide three gaps 40, 41 and 42 which permit insertion therebetween of the ears 30, 32 and 34. One ear 34 is of a greater circumferential length than the other ears 30 and 32 and can be inserted only through gap 42 which is larger than gaps 40 and 41.

In assembly, the bearing 18 is inserted in the sleeve portion 24. The retaining ring which has an aperture 44 is telescoped over the sleeve portion 24 and three bolts 46 are extended through the apertures 48 in clamping member 20 and threaded a few turns into threaded openings 50 in retainer ring 22, thereby loosely securing the retainer ring 22 to the clamping member 20. The clamping member 20 and retainer ring 22 are then projected into the throat 10 of the gear case 7 by sliding the bearing 18 over the propeller shaft 16. The clamping member 20 is then manually rotated to align ear 34 with gap 42 to permit insertion of the ears 30, 32 and 34 through the appropriate gaps. Following insertion of the ears through the gaps, the retaining ring 22 is rotated or twisted until a tab 52 engages a lug as shown in FIGURE 5 thereby preventing further rotation and positively positioning the ears behind the lugs. The clamping member 20, bearing 18 and retaining ring 22 are then secured in place by tightening bolts 46, thereby clamping the ears against the corresponding lugs and seating the annular shoulder 26 against the face 11 of the gear case 7. Outward axial movement of the bearing 18 is prevented by an inturned annular flange 54 on clamping member 20.

Various features of the present invention are disclosed in the following claims.

What is claimed is:

1. In a marine propulsion device the combination of a lower unit gear case having a throat, a retainer ring adapted for insertion in said throat, a plurality of spaced lugs on one of said throat and said retainer ring with gaps between said lugs, a plurality of spaced ears along the periphery of the other of said throat and said retainer ring, said ears being spaced for insertion in said gaps, a clamping member, one of said clamping member and said retainer ring being adapted to receive a propeller shaft bearing, and means connecting said retainer ring and said clamping member, said means connecting said retainer ring and said clamping member cooperating with said lugs and ears to secure said retainer ring and said clamping member to said gear case.

2. A marine propulsion device in accordance with claim 1 wherein said gear case has an outer face and said clamping member has a shoulder adapted to seat against said face.

3. A marine propulsion device in accordance with claim 1 wherein said gear case has an outer face and said lugs are spaced equidistantly from said outer face of said gear case.

4. A marine propulsion device in accordance with claim 1 wherein said means for connecting said retainer ring to said clamping member comprises a plurality of bolts extending through apertures in said clamping member and threaded into said retainer ring.

5. A marine propulsion device in accordance with claim 1 wherein one of said ears is circumferentially longer than the other of said ears and said lugs are spaced to provide a gap that will receive said one ear.

6. A marine propulsion device in accordance with claim 2 wherein one of said ears has, at one end thereof, a tab limiting rotation of said retainer ring relative to said gear case.

7. A marine propulsion device in accordance with claim 1 wherein said clamping member has a sleeve portion adapted to internally receive said bearing and said retainer ring has an aperture for telescopically receiving said sleeve portion.

8. A marine propulsion device in accordance with claim 1 wherein said clamping member has an inturned annular flange.

References Cited

UNITED STATES PATENTS

| | | | |
|---|---|---|---|
| 2,271,163 | 1/1942 | Spenser | 74—606 XR |
| 2,548,258 | 4/1951 | Griffith | 74—607 XR |
| 2,549,477 | 4/1951 | Kiekhaefer | 74—606 XR |

HALL C. COE, *Primary Examiner.*

U.S. Cl. X.R.

64—3

PO-1050
(5/69)

UNITED STATES PATENT OFFICE
CERTIFICATE OF CORRECTION

Patent No. 3,452,617   Dated July 1, 1969

Inventor(s) Leslie W. Foster   (Outboard Marine Corporation)

It is certified that error appears in the above-identified patent and that said Letters Patent are hereby corrected as shown below:

Column 4, Line 1,
    CLAIM 6,    "2" should read --1--

SIGNED AND
SEALED
SEP 30 1969

WILLIAM E. SCHUYLER, JR.
Commissioner of Patents